Figure 3:
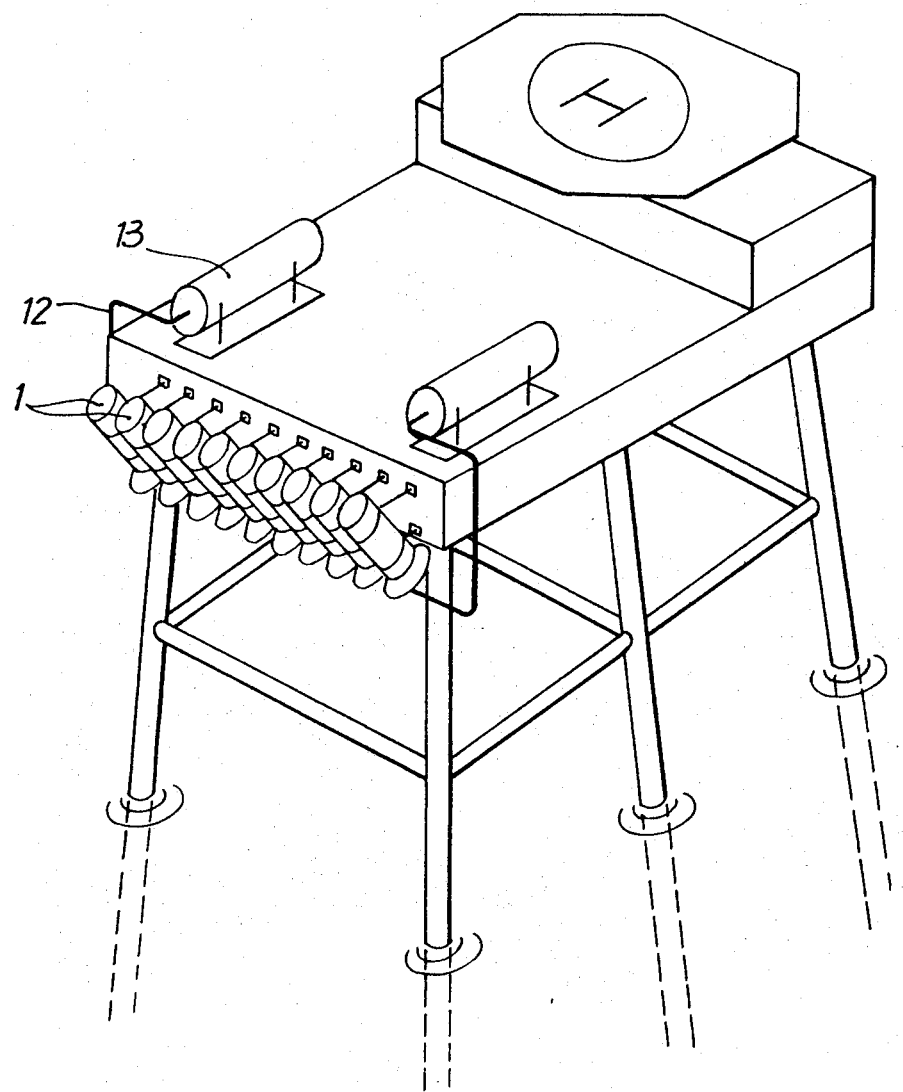

United States Patent [19]
Lazarre et al.

[11] 3,924,658
[45] Dec. 9, 1975

[54] INSTALLATION TO DISPERSE GAS EFFLUENTS

[75] Inventors: Flavien Lazarre; Jacques Rozand, both of Pau; Simonne Roumazeilles, Lons, all of France

[73] Assignee: Societe Nationale des Petroles D'Aquitaine, Paris, France

[22] Filed: Apr. 10, 1974

[21] Appl. No.: 459,585

[30] Foreign Application Priority Data
Apr. 12, 1973 France .............................. 73.13306

[52] U.S. Cl. .............................. 137/604; 431/202
[51] Int. Cl.² .............................................. F16K 19/00
[58] Field of Search ........... 48/180 C; 431/202, 353; 137/604

[56] References Cited
UNITED STATES PATENTS

| | | | |
|---|---|---|---|
| 2,560,069 | 7/1951 | Bloomer | 48/180 C |
| 3,273,627 | 9/1966 | Zink et al. | 431/202 |
| 3,664,818 | 5/1972 | Kramer | 48/180 C X |
| 3,796,209 | 3/1974 | Luft | 431/353 |

*Primary Examiner*—Robert G. Nilson
*Attorney, Agent, or Firm*—Brisebois & Kruger

[57] ABSTRACT

An appliance to disperse gas effluents into the atmosphere in the form of mixtures with controlled composition. The appliance comprises a mixing shaft, fitted with an axial high-pressure gas injector, the ratio of the section of the shaft to the section of the injector nozzle being above 2,500. It also comprises a set of fixed, sloping deflectors, an axial wheel with fixed sloping blades, and possibly a low-pressure gas inlet. Installations consisting of groups of such appliances are used to eliminate the gases that accompany liquid hydrocarbons, in the form of incombustible mixtures, while individual appliances are fitted to gas-tank or gas-pipe blow-off valves.

15 Claims, 6 Drawing Figures

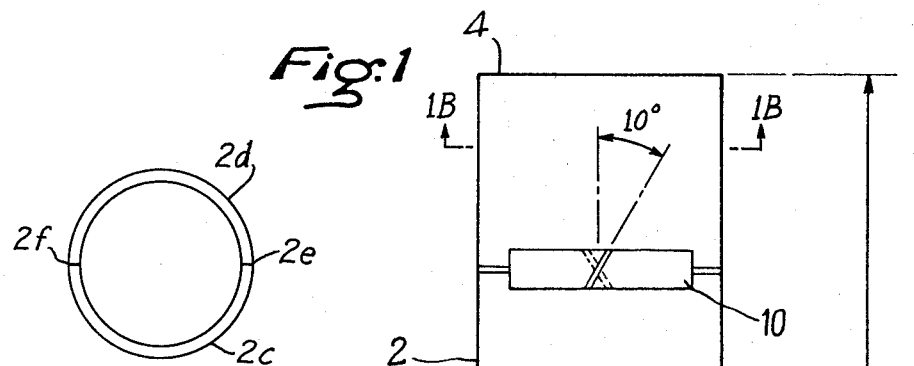
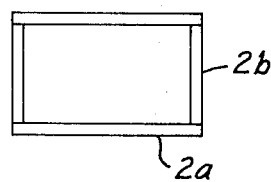
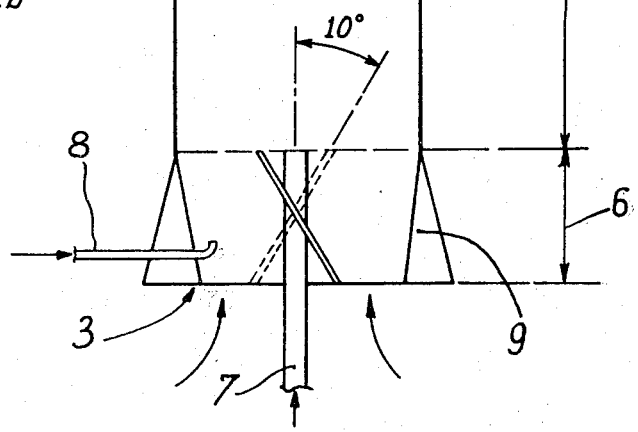
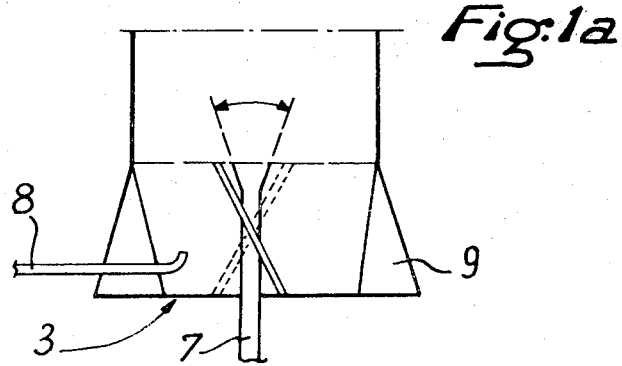

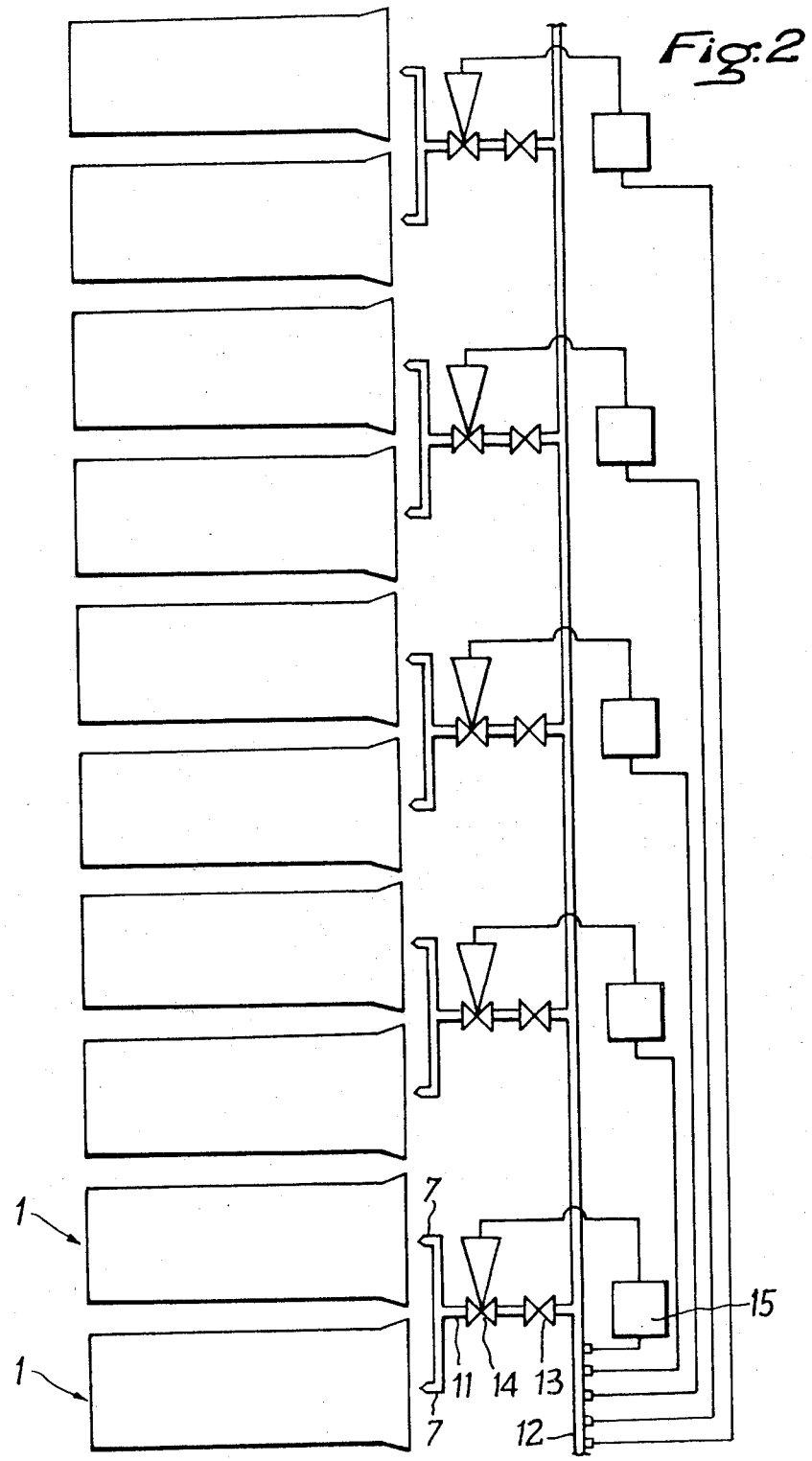

INSTALLATION TO DISPERSE GAS EFFLUENTS

This invention concerns an improved appliance for preparing, in a finite volume, a controlled mixture of air and gas effluent, such as gaseous hydrocarbons which have to be eliminated from production plants for lack of commercial outlet.

Removal of such gas raises safety problems, whether in large amounts that accompany liquid hydrocarbons produced at sea and obtained on different types of platforms, or in limited amounts of gas discharged from different points in installations on land, particularly from liquefied natural gas tanks, or in fact in any industrial gas effluent.

At sea, the gas accompanying liquid hydrocarbons is eliminated by being dispersed into the atmosphere, where the cost of installing flares would be out of proportion to the service actually rendered, either because elimination is confined to a trial period, or because the daily volumes involved during continuous production are small, or where the installation of flares could be dangerous, because of the heat given off or because of pollution resulting from combustion fall-out.

In storage and processing plants on land, the many blow-off valves on pipes or tanks open into the atmosphere, because collection of the gas from them and conveyance to a flare would require complex and expensive installations.

Even though the discharge of combustible gas into the atmosphere from production installations at sea, or from storage installations on land, is done in compliance with regulations, concerning for instance the location of sources of heat and the use of flameproof electrical switchgear, it still often leads to accidents, because of the formation of large volumes of explosive mixtures, and their persistence.

Existing dispersal appliances comprise a vertical flue, a revolving axial mixer with wide blades, and a number of vertical nozzles, the openings of which are evenly distributed over a plane below the blade mixer. Residual combustible gas is injected through these nozzles, and air from the atmosphere enters through the lower end of the flue.

Because of their large size (at least 20 sq.m) and weight (more than 10 tons), such appliances have to be placed on the actual drilling or production platform, or on a separate platform, involving considerable outlay in either case.

Furthermore, the power needed to drive the mixers involves extra consumption on the platform, where conditions make any such supplementary requirements particularly costly.

It has also been found that the distribution of the combustible gas, in the space below the mixer blades, through a necessarily limited number of nozzles, is not uniform, and the mixture produced by a wide-bladed propeller can also show considerable variations in composition at different points in a large appliance, so that satisfactory operation cannot be guaranteed with varying flow-rates. In addition, since the air flow is constant, there must be no accidental excess of combustible gas.

The installation proposed in this invention not only overcomes difficulties resulting from imperfect mixing, where large amounts of gas under pressure are involved, but also satisfies other requirements, such as those involved in draining gas from storage installations, where the flow-rate is obviously much smaller, and where the gases are of different densities.

The invention concerns an installation to disperse gas effluent, such as hydrocarbon gases, into the atmosphere, comprising at least one dispersal appliance, which can easily be transported, and is characterized by the fact that it includes a mixing shaft, or several coaxial mixing shafts, near one end, the ratio of the square roots of the shaft and injector nozzle sections being between 50 and 300.

This ratio is based on the smallest cross-sectional areas of both shaft and injector.

Tests have shown that for the gas cone from the injector to reach the sides of the mixing shaft, so as to obtain maximum air-suction effect, and also so that all the air is used in the mixture, the length of the mixing shaft has to be at least three times its diameter.

These tests also showed that, in the field of utilization, a simple equation could be established between the gas concentration of the effluent, and the square root of the ratio of the section of the mixing shaft to the section of the injector, and the pressure.

For example, for an effluent gas containing 95% methane, the percentage of gas in the mixture is substantially in accordance with the following formula:

$$N = (19.1/R - 0.033) P + 122/R + 0.28$$

where $N$ is the percentage of gas, $R$ the square root of the ratio of the sections of mixing shaft and injector nozzle, and $P$ the absolute pressure in bars (for a range of values for $R$ of 50 to 500, and for $P$ of 3 to 30 bars).

The lower flammability limit of a 95% methane gas is 5%. Maintenance of the gas content of the mixture below 4%, namely at 80% of the flammability limit, if the absolute injection pressure is slightly above 1 bar, requires the ratio of the sections to be more than 900, and the ratio of the square roots consequently more than 30.

If the absolute injection pressure is 9 bars, these ratios have to be above 5,300 and 73 respectively.

In one recommended embodiment, the mixing shaft has a uniform cross-section, with a funnel-shaped section at the end near the gas-inlet point.

In this same embodiment, the shaft is circular in cross section.

In some embodiments, mainly those intended to handle large amounts of gas, and where, to reduce size and make handling operations easier, the length of the shaft has to be reduced, it is fitted with a number of deflectors attached to the inner wall, at an angle of approximately 10 degrees to its axis.

In these same embodiments, a wheel with fixed blades, at an angle of approximately 10 degrees to the shaft axis, is located on the passage of the mixture, concentric with the shaft axis.

In other embodiments, particularly those to disperse the largest amounts of gas, the end of the gas injector consists of a divergent nozzle, which may be preceded by a convergent section.

In some embodiments, there is at least one low-pressure gas inlet opening into the shaft near the funnel-shaped part.

Where very large amounts of residual gas have to be handled continuously, installations comprise a set of these dispersal appliances, connected with the high-pressure gas source by a main pipe comprising several branch-pipes to supply the injectors, each such branch-pipe containing a manually-operated valve, and an automatic valve controlled by a pressure detector on the main pipe.

In such installations, each set of at least two dispersal appliances is supplied from a single branch-pipe.

Also in such installations, the automatic valve control devices are set to different pressures.

For installations to disperse residual gas on board a drilling or production platform at sea, the set of appliances is located along part of the circumference of the platform, with the longitudinal axis of the appliances at an acute angle to the perpendicular, so that the appliance outlets are directed upwards and away from the platform.

In certain embodiments of such installations, to make them easier to install and assemble, the mixing shafts are rectangular in cross-section, consisting of two frontal plates assembled by evenly spaced side plates.

In embodiments designed to disperse a large gas jet, which may have an uncontrollable flow rate, without dividing it, a mixing shaft consisting of two half-tubes, assembled by means known in the prior art, on a longitudinal plane symmetrical to the mixing shaft, is preferably used. This can be done for example in the case of a broken pipe or any other source that could involve large reserves of gas, such as a gas-tank leak or damaged wellhead.

In the embodiments where the injector consists of the actual leakage point, the lower end of the mixing shaft is above this opening, at a height such that the air-inlet area is at least equal to the cross-sectional area of the lower end of the shaft.

I will be easier to understand the invention from reading the following description, of non limitative embodiments illustrated by the accompanying figures:

FIG. 1 - General diagram of a dispersal device with a mixing shaft.

FIG. 1a - Dispersal device with a divergent gas injector.

FIG. 1b. A reduced size view in section of a rectangular mixing shaft taken along line 1B—1B of FIG. 1.

FIG. 1c. A reduced size view corresponding to FIG. 1b, but showing a mixing shaft consisting of two half-tubes, of alternate cross-section.

FIG. 2 - A set of dispersal appliances.

FIG. 3 - Dispersal appliances on board a platform at sea.

FIG. 1 shows the general diagram of a dispersal device 1, comprising a mixing shaft 2, open at both ends, one of which 3 is the air inlet and the other 4 the gas mixture outlet. This shaft 2 comprises a main cylindrical part 5 which may be circular or rectangular in cross-section, depending on erection facilities and problems of space. One part 6 of the mixing shaft, close to the end 3, opens outward in a funnel-shaped section, which takes the form of a truncated cone when the shaft is circular in cross-section. The nozzle of a high-pressure gas injector 7, on the same axis as the shaft, is located close to where the conical section of the shaft joins the cylindrical section.

At least one low-pressure gas-inlet nozzle 8 enters the mixing shaft through the side of the conical section 6.

A device such as this where the ratio of length to diameter is 10, produces a homogeneous effluent or mixture at the end 4.

Where this ratio has to be reduced to save space, a homogeneous mixture can still be obtained if a number of deflectors 9 are fixed to the inside wall of the shaft, in the funnel-shaped part 6, at an angle of approximately 10 degrees to the shaft axis, and if a wheel 10, concentric with the shaft axis, and with fixed blades at an angle of approximately 10 degrees to the shaft axis, is also located on the passage of the mixture, approximately two thirds way along the shaft.

FIG. 1*a* shows, in diagrammatical form, an installation in which the end of the gas injector consists of a divergent nozzle. For a given appliance and ratio of diameters, and with gas arriving at a pressure of more than 4 bars, the use of a divergent nozzle allows pressure, and accordingly flow-rate, to be increased by 20% without increasing the percentage of gas in the mixture.

FIG. 1*b* shows a reduced size section view of a rectangular mixing shaft consisting of two frontal plates 2a assembled by evenly spaced side plates 2*b*. In certain embodiments of the installations, the rectangular shape of the mixing shafts makes them easier to install.

FIG. 1*c* shows an alternate cross-section corresponding to FIG. 1*b* but where the shaft 2 consists of two half-tubes 2*c* and 2*d* assembled at points 2*e* and 2*b*. In case of a broken pipe or other source that could involve large reserves of gas, the sections 2*c* and 2*d* may be assembled around the source and secured together at 2*e* and 2*f* by conventional means such as by bolting or by use of latches.

FIG. 2 shows, in diagrammatical form, a set of dispersal appliances 1 divided into pairs, with the injectors for devices in the same pair communicating, by means of a branch-pipe 11, with a main pipe 12 leading from the high-pressure gas source. Each branch-pipe contains a manually operated valve 13, and an automatic valve 14 controlled by a pressure detector 15 on the main pipe. Controls for these automatic valves are set for different pressures.

In an installation of the type illustrated in FIG. 2, consisting of groups comprising equal numbers of dispersal appliances, with the same characteristics, the pressure detectors are regularly calibrated to progressively higher levels, so that the groups come into operation in turn, as pressure (and accordingly the gas flow-rate) increase, and conversely are shut off to match any drops in pressure, (and accordingly in the gas flow-rate).

The pressure detectors thus allow the dispersal appliances to operate to suit flow-rate, under close to optimum conditions.

FIG. 3 shows one arrangement of a set of dispersal devices 1 on board a hydrocarbon production platform at sea. The appliances are located in such a way that the longitudinal axis of each one is at an angle of approximately 45° to the perpendicular, keeping the effluent outlet away from the edge of the platform. This arrangement ensures that the platform is not polluted by effluent.

The main pipe 12 is shown connected with two high-pressure separators 13, forming part of platform production installations.

FIGS. 1, 2 and 3 relate to a specimen installation capable of handling 150,000 normal cubic meters a day of 95% methane gas, coming from a 9-bar separator and using a set of ten appliances with individual capacities of 15,000 normal cubic meters a day. The mixing shaft of these appliances is 0.95 meters in diameter and 4 meters long, and the injector nozzle is 0.95 centimeters in diameter, the ratio of the sections being 10,000. Under these conditions, the mixture contains 3% gas.

A device to detect the percentage of gas in the air (not shown here) is placed at the outlet end of each appliance. The percentage of gas in the mixture can rise seriously only if there is a major change in the ratio of shaft section to injector nozzle section, and this can happen only if the air supply is reduced, in other words if the grid (not shown here) protecting the air inlet is partly blocked. If the percentage of gas in the mixture increases in this way, the appliance in which the incident occurs is automatically shut down, by means of a safety device (not shown here).

This new dispersal appliance possesses two self-regulating properties.

First, a 10% increase in flow-rate produces a rise of only 0.2% gas in the mixture.

Second, the quantity of air theoretically needed to obtain an incombustible mixture depends substantially on the density of the gas, whereas the quantity of air actually drawn in by the gas depends on the square root of the density of the gas.

Tests show that actual operating conditions vary very little from these rules, and that there is partial self-regulation in accordance with the rate of flow and the density of the gas injected.

Finally, this new device is static, containing no moving parts, so that its installation does not require any additional driving force or means of generating energy.

Where this new dispersal apparatus is used to eliminate gas from processing or storage installations, handling 240 to 720 cubic meters a day, the mixing shaft is 20 centimeters in diameter and 1 meter long, and the injector nozzle is 2 millimetres in diameter.

This means that the dispersal appliance is easy to transport, and can be made of lightweight sheetmetal, or preferably plastic.

This new dispersal appliance, apart from the three applications described above, can be used to solve many problems in the chemical industry, such as the elimination of gas effluents.

What is claimed is:

1. An installation to disperse gas effluent, such as hydrocarbon gases, into the atmosphere, comprising at least one dispersal appliance, which can easily be transported, said dispersal appliance comprising a mixing shaft, open at both ends, and a single high-pressure gas injector, placed along the longitudinal axis of the shaft, near one end, the ratio of the square roots of the shaft and injector nozzle section, based on the smallest cross-sectional areas of both shaft and injector, being between 50 and 300.

2. An installation as defined in claim 1, in which the mixing shaft has a mixing region of uniform cross-section with a funnel-shaped section at the end near the gas-inlet point.

3. An installation as defined in claim 1, in which the mixing shaft is circular in cross section.

4. An installation as defined in claim 1, in which the mixing shaft has plural deflectors attached to an inner wall of the mixing shaft, said deflectors extending at an angle of approximately 10 degrees to the mixing shaft axis.

5. An installation as defined in claim 1, in which a wheel concentric with the shaft axis with fixed blades, at an angle of approximately 10 degrees to the shaft axis, is located in the path of the mixture downstream of the inlet.

6. An installation as defined in claim 1, in which the end of the gas injector is a divergent nozzle.

7. An installation as defined in claim 1 wherein the shaft has a funnel-shaped inlet and at least one low-pressure gas inlet opening into the shaft near the funnel-shaped inlet.

8. An installation as defined in claim 7, in which the set of dispersal appliances is located along part of the perimeter of a hydrocarbon production platform, with the longitudinal axis of the appliance at an acute angle to the vertical, so that the appliance outlets are directed upwards and away from the platform.

9. An installation as defined in claim 1 wherein the installation includes a set of at least two dispersal appliances, connected with a high-pressure gas source by a main pipe comprising several branch-pipes to supply the injectors, each such branch-pipe containing a manually-operated valve.

10. An installation as defined in claim 9, in which each branch-pipe further contains an automatic valve controlled by a pressure detector on the main pipe.

11. An installation as defined in claim 10, in which the automatic valve control devices are set to different pressures.

12. An installation as defined in claim 9, in which each set of at least two dispersal appliances is supplied from a single branch-pipe.

13. An installation as defined in claim 9, in which the mixing shafts are rectangular in cross-section, consisting of two frontal plates assembled by evenly spaced side plates.

14. An installation as defined in claim 1, comprising a mixing shaft, said mixing shaft comprising two half-tubes, assembled on a longitudinal plane, said mixing shaft being coaxial with the high pressure gas injector.

15. An installation as defined in claim 14, in which the high pressure gas injector comprises a leaking gas means, and the lower end of the mixing shaft is above an opening from which the gas leaks and at a height such that the air-inlet area is at least equal to the cross-sectional area of the lower end of the shaft.

* * * * *